US008274771B2

(12) United States Patent
Veil

(10) Patent No.: US 8,274,771 B2
(45) Date of Patent: Sep. 25, 2012

(54) SAFETY SWITCHING DEVICE AND MODULAR FAILSAFE CONTROL SYSTEM

(75) Inventor: Richard Veil, Stuttgart (DE)

(73) Assignee: Pilz GmbH & Co. KG, Ostfildern (DE)

( * ) Notice: Subject to any disclaimer, the term of this patent is extended or adjusted under 35 U.S.C. 154(b) by 371 days.

(21) Appl. No.: 12/753,254

(22) Filed: Apr. 2, 2010

(65) Prior Publication Data

US 2010/0259862 A1 Oct. 14, 2010

(30) Foreign Application Priority Data

Apr. 8, 2009 (DE) ........................ 10 2009 018 140

(51) Int. Cl.
*H02H 7/00* (2006.01)

(52) U.S. Cl. ...................................................... 361/93.3

(58) Field of Classification Search .................. 361/93.3
See application file for complete search history.

(56) References Cited

U.S. PATENT DOCUMENTS 2,580,304 A * 12/1951 Kraft ............................... 377/15
4,318,084 A * 3/1982 Scott et al. ................. 340/309.8
6,778,370 B1 * 8/2004 LaPlace et al. ................. 361/71
7,239,048 B2 * 7/2007 Ehrlich et al. ................ 307/326
7,593,205 B2 * 9/2009 Veil ............................. 361/93.1
2003/0011250 A1 1/2003 Pullmann et al.
2003/0058602 A1 3/2003 Veil
2008/0225457 A1 9/2008 Korrek

FOREIGN PATENT DOCUMENTS

DE 100 11 211 A1 9/2001
DE 100 20 075 C2 11/2001
DE 202 03 165 U1 8/2002
DE 10 2006 036 384 A1 3/2007
EP 0 193 732 9/1986
JP 9-265884 10/1997
WO WO 2005/104155 A1 11/2005
WO 2006/060264 A2 6/2006
WO 2007/014725 A1 2/2007

* cited by examiner

*Primary Examiner* — Stephen W Jackson
(74) *Attorney, Agent, or Firm* — Harness, Dickey & Pierce, P.L.C.

(57) ABSTRACT

A safety switching device for a modular failsafe control system for switching on and safely switching off an electrical load, having at least one switching element which is subject to wear and is designed to carry out a switching process by means of a control signal which is generated by the control system, in order to switch the electrical load, comprising an apparatus for detection of the number of switching processes carried out and having a memory apparatus for permanent failsafe storage of the detected number.

16 Claims, 1 Drawing Sheet

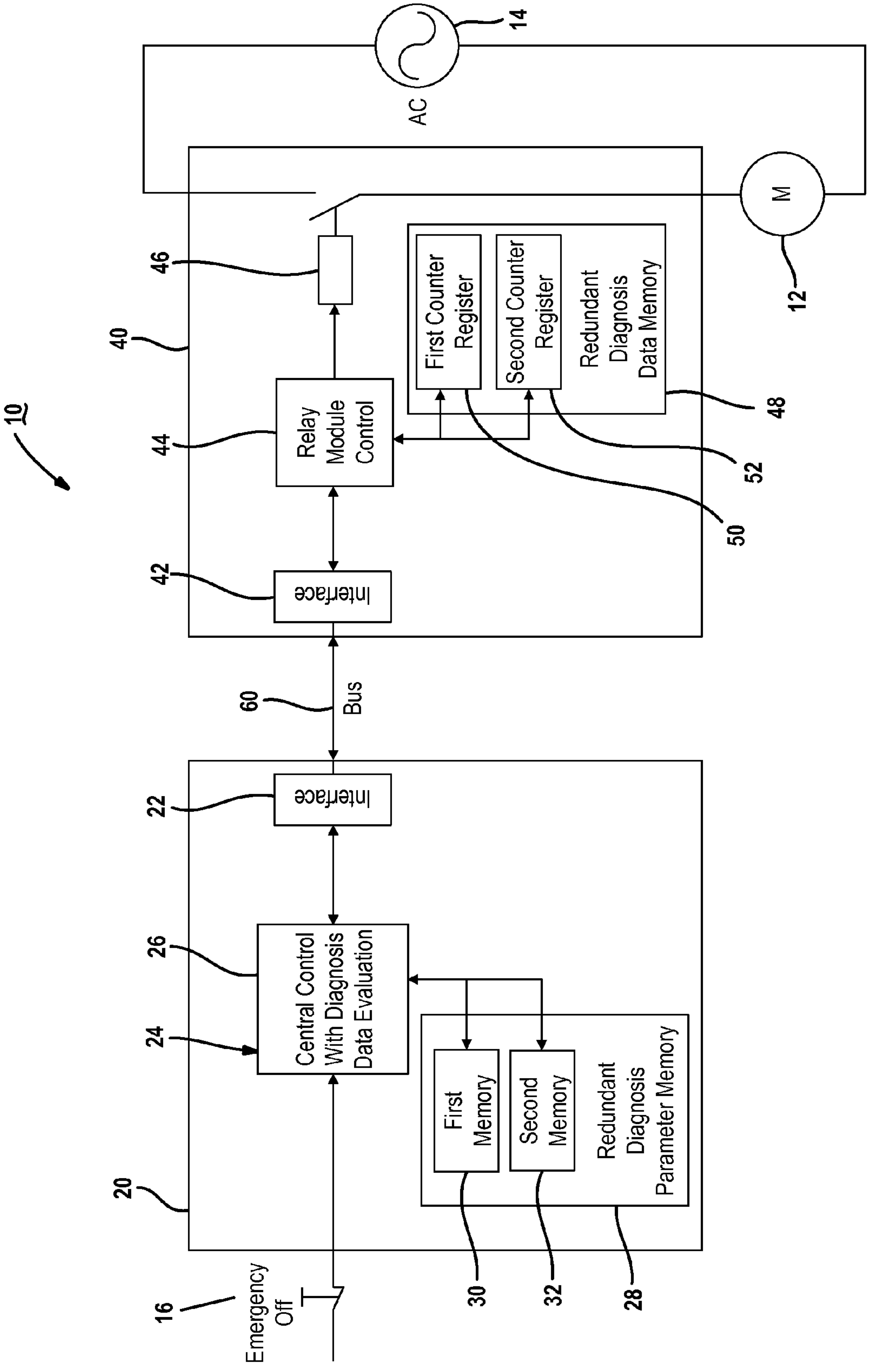
10
AC
14
M
12
40
46
44
42
Relay Module Control
Interface
First Counter Register
Second Counter Register
Redundant Diagnosis Data Memory
48
52
50
60
Bus
20
22
24
26
Interface
Central Control With Diagnosis Data Evaluation
First Memory
Second Memory
Redundant Diagnosis Parameter Memory
30
32
28
16
Emergency Off

SAFETY SWITCHING DEVICE AND MODULAR FAILSAFE CONTROL SYSTEM

CROSS REFERENCES TO RELATED APPLICATIONS

This application claims priority of German patent application DE 10 2009 018 140.7 filed on Apr. 8, 2009.

BACKGROUND OF THE INVENTION

The present invention relates to a safety switching device for a modular failsafe control system for switching on and safely switching off or disconnecting a load, having at least one switching element which is subject to wear and is designed to carry out a switching process by means of a control signal which is generated by the control system, in order to switch the load. The invention furthermore relates to a modular failsafe control system for switching on and safely switching off an electrical load, in particular an electrically driven machine, via at least one switching device, having a control apparatus for evaluation of input signals and for production of a control signal, which is intended for the switching device, as a function of the evaluation.

Switching devices such as these are generally known and form a component of failsafe control systems, which are generally also referred to as safety switching devices. Failsafe control systems are used to safely evaluate the signal from a safety transmitter, for example an emergency-off switch, a guard door position switch etc., and to operate one or more safe output contacts of a switching device. Actuators, for example contactors, valves, motors, dangerous machine parts, for example saw blades, robot arms, high-voltage devices, etc. are then brought to a safe state via these switched output contacts. The applicant offers a multiplicity of different safety switching device types under the name “PNOZ”. One example of a safety switching device of modular design with a modular failsafe control system and a safety switching device is disclosed, for example, in DE 100 20 075 C2. A safety switching device from the applicant is also disclosed in the document DE 100 11 211.

Since safety switching devices such as these are used in safety-critical environments, the dangers which can be caused by defective components must be coped with. In addition to measures to cope with faults, for example by means of redundant design and the use of automatic diagnostic tests for identification of hazardous hardware failures, consideration of the failure rates of the components which are used in safety switching devices is becoming increasingly important.

As is known, safety switching devices cannot be absolutely safe. The risk that the safety switching device will fail as a result of the failure of a component must therefore be assessed, and this risk must be below an accepted limit value.

In the case of electrical and electronic components, it is normally assumed that their failure rate is constant. The risk of a failure is therefore the same for a new safety switching device and for an old, physically identical safety switching device.

In the case of mechanical and electromechanical components, such as relays, contactors, brakes etc., wear must normally be expected. The failure rate therefore rises sharply beyond a wear limit, as a result of which the accepted risk is exceeded at the end of the life of the component. It is therefore required that these components be replaced before their wear limit, or that the components be operated such that the wear limit is not reached during the envisaged operation.

The component reliability must be quantified in order to verify that the present standards IEC 61508 and ISO 13849-1 are being complied with.

The requirements from the standards relating to functional reliability and the continuous efforts to increase the safety and the availability of safety switching devices are leading to the desire to improve the diagnosis, in particular of components which are subject to wear.

For the purposes of the present application, “diagnosis” is used in the sense of the IEC 61508 standard series.

In this standard series, “diagnosis” is understood to mean the use of automatic diagnostic tests for identification of hazardous hardware failures in safety-related systems.

SUMMARY OF THE INVENTION

Against this background, the object of the present invention is to develop the initially cited switching device so as to allow better, in particular safer, diagnosis.

In the case of the switching device mentioned initially, this object is achieved by providing an apparatus for detection of the number of switching processes carried out (detection apparatus), which has a memory apparatus for permanent failsafe storage of the detected number.

In other words, this means that a counter is maintained in a decentralized form in the switching device itself, which indicates the number of switching processes carried out (also “number of switching cycles”) and which can be evaluated centrally at the control system level. In order to take account of the stringent safety requirements, the memory apparatus is equipped with failsafe memories which, furthermore, “permanently” store the information, that is to say store the information even when there is no operating voltage (zero-voltage-proof). For the purposes of the present application, the expression “failsafe” should be understood as meaning that, even though the memory may be defective, this must nevertheless be identified, in order to avoid misinterpretation of the memory content.

The solution according to the invention provides the user of a modular safety switching device with a means for diagnosis of switching elements which are subject to wear, on the basis of the stored failsafe number of switching processes carried out.

Particularly when relays are used as switching elements, the number of switching processes, stored in a failsafe manner can be used to avoid these switching elements being operated beyond the wear limits specified by the manufacturers. Furthermore, for example, a warning system can also be provided on the basis of the stored number of switching processes, in order to inform the user in good time before the wear limit is reached, and/or to change to a different operating mode, in order to avoid a safety-critical behavior in the event of failure of the switching element.

In one preferred embodiment, the detection apparatus has a counter circuit which uses a counting signal to increment a count, preferably by one, and stores this count in the memory apparatus.

In other words, this means that the decentralized safety switching device has all the elements which are required for detection of the number of switching processes, specifically on the one hand a counter which can be incremented with the aid of a counting signal, and on the other hand the already mentioned memory apparatus for storage of the count. In consequence, there is therefore no need for the central control system to supply the count, and for this to be stored on a decentralized basis.

In one preferred embodiment, the counting signal is generated by the central control system and is supplied to the decentralized safe switching device, as a result of which the counter there can be appropriately incremented.

However, it is even more preferable for the decentralized switching device to be equipped with an apparatus for detection of the control signal and for production of a counting signal. In other words, this means that the decentralized safety switching device uses the control signal which is supplied to it in any case for switching the switching element to produce a counting signal.

This refinement is particularly simple and develops the idea of the decentralized structure in such a way that the number of switching processes carried out can be detected on a decentralized basis by the safety switching device, without the aid of the control system.

In one preferred embodiment, the memory apparatus has an associated means for fault identification, in order to identify faults in the memory apparatus.

A means such as this therefore has the task, for example, of checking whether the memory apparatus is operating in a failsafe manner, that is to say for example that the individual memory cells required for storage are serviceable. By way of example, a test such as this can be carried out cyclically.

Alternatively or in addition to this, provision is preferably made for the memory apparatus to be equipped with two redundant memory elements.

This solution has the advantage that, if the stored data is faulty, operation can be continued with the redundant data from the other memory element. This therefore allows failsafe, high-availability, decentralized diagnosis.

As an alternative to two redundant memory elements, it is, of course, also possible to provide the stored data item (that is to say the number of switching processes) with parity bits, as a result of which it is possible to identify whether the data item is faulty. Alternatively, for example, it would also be possible to carry out a cyclic redundancy check (CRC), with a corresponding CRC value being stored together with the corresponding data item. A test such as this not only makes it possible in principle to identify a fault, but it is also possible to correct the fault. This makes it possible to provide failsafe decentralized diagnosis.

It is self-evident that other means and methods are likewise feasible for identifying, and if necessary correcting, data items which have been stored incorrectly.

In one preferred embodiment, the switching device according to the invention has a means for reading the stored number of switching processes and for transmitting the number read to the control system.

In other words, this means that the central control system can check the number of switching processes by a connective switching device, in order to carry out a diagnosis or test on this basis.

Alternatively, of course, it would also be feasible to carry out the evaluation and/or diagnosis on the basis of the stored number of switching processes on a decentralized basis of the switching device. It would be feasible in this case for the safety switching device simply to output diagnosis status messages to the central control system. In this case, the required parameters for diagnosis, such as the number of switching cycles before the wear limit is reached, etc. are stored in the switching device.

The advantage of such decentralized diagnosis is, in particular, the flexibility, since no data need be newly passed on to the central control system as a result of the replacement of a switching device or an addition, with the switching device itself instead "also providing" the diagnosis parameters.

The object on which the invention is based is also achieved by a modular failsafe control system of the type mentioned initially, in that a diagnosis parameter memory apparatus for storage of predeterminable switching process threshold values for the at least one switching device and a diagnosis data analysis apparatus are provided, which are designed to compare the number of switching processes read from a switching device with the stored threshold values, and to initiate an action as a function of this.

In other words, this means that the diagnosis is carried out centrally in the control system, with the required diagnosis parameters such as switching process threshold values, being stored there. If the diagnosis leads to the result that, for example, a switching element in a switching device will shortly reach the wear limit, the control system can initiate a specific action. In the simplest case, an action such as this may be understood to be the output of a warning that the wear limit will soon be reached and, for example, that the switching element must be replaced. Another action could be to change to a restricted mode in which, for example, only a reduced machine speed is allowed in a restricted mode such as this or normal operation is permitted only for a restricted time. A further action could be to switch the safety system to the safe state and to interrupt operation.

It is self-evident that the features mentioned above and those which are still to be explained in the following text can be used not only in the respectively stated combination but also in other combinations or on their own without departing from the scope of the present invention.

BRIEF DESCRIPTION OF THE DRAWINGS

Further advantages and refinements of the invention will become evident from the description and the attached drawing.

FIG. 1 is a schematic block diagram of a safety switching device, showing only those assemblies which are necessary for the invention.

DETAILED DESCRIPTION OF PREFERRED EMBODIMENTS

In the single FIGURE, a safety switching device is illustrated in the form of a block diagram and is annotated with the reference symbol 10. For clarity reasons only those assemblies which are required for explanation of the invention are illustrated in this block diagram. With regard to a specific mechanical and electrical design of a safety switching device 10 such as this, reference is made to the documents cited in the introductory part of the description or to the written documents, which are available from the applicant, relating to the "PNOZmulti" or "PSSu" safety switching device.

In an entirely general form, the safety switching device 10 is used to connect a load 12, for example an electric motor, to a voltage supply 14, and to disconnect it therefrom. The load 12 is disconnected from the voltage supply 14 with the aid of the safety switching device 10, in a safe manner, for example when an emergency-off switch 16 is operated. At this point, it should be noted that this circuitry of a safety switching device 10 is purely by way of example and is representative of one of a large number of different circuitries. In particular, other switches may be used instead of the emergency-off switch 16, for example light grids, light barriers, etc.

The safety switching device 10 illustrated in the FIGURE is of modular design and comprises a central module 20, which is also referred to in the following text as a control system, and at least one relay module 40, which is also referred to in the following text as a switching device. The control system 20 is connected to the switching device 40 via a data bus 60. Various systems may be used as the bus 60, with the applicant for example also offering a safe bus system which could be used here.

In order to allow communication between the control system 20 and the switching device 40 to be handled via the bus 60, a respective interface 22 or 42 is provided, with these interfaces 22, 42 being matched to the respectively used bus system.

Both the control system 20 and the switching device 40 have a respective control unit 24 or 44, which are connected to the respective interfaces 22 and 42. The control units 24, 44 are responsible for controlling all of the processes within the respective module 20, 40, there being no need to describe these in detail at this point. In fact, reference is made to the documents already mentioned, in which the design is explained.

The central control unit 24 comprises an evaluation unit 26 which evaluates specific data for diagnosis purposes. In particular, this relates to evaluation of the number of switching processes (number of switching cycles) which the switching elements 46 in the connected switching devices 40 have carried out. This number is important when the switching elements 46 are switching elements which are subject to wear, for example relays.

The central control unit 24 has an associated memory 28, which comprises at least two memory elements 30, 32. The memory unit 28 is used to store diagnosis parameters, with redundant storage being required for safety reasons. In other words, this means that the two memory elements 30, 32 which are provided each store identical diagnosis parameters, as a result of which, even in the event of a faulty data item, the data item stored in the redundant memory element can be used to continue operation.

Other options for failsafe data storage are, of course, feasible. For example, it would also be possible to store a CRC value for each stored data item, as a result of which, when this data item is read, it is on the one hand possible to determine whether a fault is present, and on the other hand for this fault to be corrected.

By way of example, the diagnosis parameters to be stored are values for switching processes of switching elements 46 which are subject to wear. In consequence, one such diagnosis parameter may, for example, be the number of switching processes of a switching element which the manufacturer permits for this switching element. In other words, this means that the switching element should be replaced when this number of switching processes has been reached.

It is self-evident that other diagnosis parameters can likewise be stored in the memory unit 28. Furthermore, it should be noted at this point that the stored diagnosis parameters relate to a single modular switching device 40. In the situation in which a plurality of different switching devices 40 are connected to the bus 60, the memory unit 28 contains the appropriate diagnosis parameters for each switching device.

The modular switching device 40 likewise comprises a memory unit 48 which is associated with the control unit 44, that is to say it is connected to the latter via appropriate data and control lines. The memory unit 48 is in the form of a redundant memory unit, as a result of which memory elements 50, 52 are provided which store identical data.

The memory unit 48 is designed to store diagnosis data, and in the present exemplary embodiment, one diagnosis data item is the number of switching processes of the switching element 46.

In order on the one hand to detect the number of switching processes and on the other hand to store them permanently and in a failsafe manner, a first counter register 50 and a second counter register 52 are provided, which may be part of the memory unit 48. The two counter registers 50, 52 store a count value, which is incremented by one when a specific event occurs, in this case the switching element 46 being switched on.

An important feature of the two counter registers 50, 52 is that they retain their register value even in the absence of the supply voltage, that is to say they are zero-voltage-proof.

Furthermore, it is necessary to ensure that the stored counter which indicates the number of switching processes is failsafe. This does not necessarily mean that it is necessary to store redundant data in order to allow operation to continue with the redundant second data item when one data item is faulty, but initially only that faulty storage of a data item is identified.

Various methods exist for this purpose, in which—as already previously mentioned—one option is to store additional parity bits, in order to identify faulty storage operations. Another option is to store a so-called CRC value (cyclic redundancy check) in addition to the data item, as a result of which it is not only possible to identify a fault on the basis of this CRC value, but in some circumstances it is also possible to correct the fault.

In order to ensure operation of the switching device even in the event of a faulty counter value, it is, however, preferable to provide the second counter register 52, as illustrated in the FIGURE, as redundancy. In other words, this means that the number of switching processes is stored in an identical form in two different counter registers 50, 52.

In order to increment the values in the counter registers 50, 52 by one, the control unit 44 generates a counting signal and transmits this to the two counter registers 50, 52 whenever it transmits a switch-on signal to the switching element 46.

Alternatively, it would, of course, also be feasible for the control system 20 to generate a counting signal and to transmit this via the bus 60 to the respective switching device 40.

In order to evaluate the value stored in the counter register 50 or 52, the control system 20 calls up a diagnosis program, which requests the data item stored in the counter register 50, 52 for the switching device 40. The result of this is that the switching device 40 transmits this data item to the interface 42 and, via the interface 42 and the bus 60, to the control system 20. After receiving this data item which, for example, indicates the number of switching processes carried out, a comparison is carried out with one or more diagnosis parameters which are stored in the memory unit 28. By way of example, these diagnosis parameters are various threshold values, which are normally specified by the manufacturer of the switching element 46 and initiate a specific action when overshot. By way of example, if one diagnosis parameter describes the number of switching processes prior to the wear limit, the switching device 40 is safely switched off via the control system 20 when this value is reached.

In addition to these diagnosis parameters, further diagnosis parameters are feasible, as already indicated. For example, one further diagnosis parameter could indicate the number of switching processes beyond which a warning must be output, which makes the user aware that the corresponding switching element 46 in the switching device 40 must be replaced.

Finally, one action which is initiated by the control system may also be to allow operation of the load 12 only at a reduced speed or only for a specific time.

It is therefore self-evident that different diagnosis parameters (for example as threshold values) are stored in the memory unit 28 for different actions. These diagnosis parameters may originate from the manufacturer of the switching device, or else from the user of the safety switching device 10. In other words, this means that the diagnosis data stored in the memory unit 28 can be predetermined and can be adjusted.

Since the threshold values stored as diagnosis parameters will frequently not be reached until the safety switching device has been in operation for several years, it is on the one hand absolutely essential that the diagnosis parameters and diagnosis data stored in the two memory units 28, 48 are retained permanently even in the absence of the operating voltage. On the other hand, the counter registers must be equipped with an adequate number of bits to allow even very large values to be stored, without overflowing.

With the aid of zero-voltage-proof and failsafe storage of the number of switching processes within a modular switching device 40, it is possible to carry out diagnosis in order to allow the failure risk to be detected on the basis of stored diagnosis parameters and then to allow specific actions to be initiated on the basis of an evaluation. This results in the availability of the safety switching device being increased, since the failings caused by wear of switching elements can be substantially avoided by reaction in good time.

As an alternative to the exemplary embodiment shown in the FIGURE, it would also be feasible for the diagnosis parameters associated with a switching device 40 to be stored in a decentralized form in the respective switching device, instead of being stored centrally. The central control system 20 can then request these diagnosis parameters via the bus, in order to store them in its own memory unit 28. It would, of course, also be feasible for the diagnosis to be carried out in a decentralized manner in the respective switching device 40, and for only the result to be transmitted to the central control system.

What is claimed is:

1. A safety switching device for a modular failsafe control system for switching on and safely switching off an electrical load, having at least one switching element which is subject to wear and is designed to carry out a switching process by means of a control signal which is generated by the control system, in order to switch the electrical load, comprising a detection apparatus for detecting the number of switching processes carried out and having a memory apparatus for permanent failsafe storage of the detected number.

2. The switching device as claimed in claim 1, wherein the switching element is a relay.

3. The switching device as claimed in claim 1, wherein the detection apparatus has a counter circuit which uses a counting signal to increment a count, preferably by one, and stores this count in the memory apparatus.

4. The switching device as claimed in claim 3, wherein the counter circuit and the memory apparatus are in the form of a unit.

5. The switching device as claimed in claim 3, wherein the counting signal is generated and supplied by the control system.

6. The switching device as claimed in claim 3, wherein the detection apparatus has an apparatus for detection of the control signal and production of a counting signal.

7. The switching device as claimed in claim 1, wherein the memory apparatus has an associated means for fault identification, in order to identify faults in the memory apparatus.

8. The switching device as claimed in claim 1, wherein the memory apparatus has two redundant memory elements.

9. The switching device as claimed in claim 8, wherein the number of switching processes is stored in both memory elements.

10. The switching device as claimed in claim 8, wherein a checksum of the number which is stored in one of the memory elements is stored in the other memory element.

11. The switching device as claimed in claim 1, wherein a means is provided for reading the stored number of switching processes and for transmitting the number read to the control system.

12. A modular failsafe control system for switching on and safely switching off an electrical load, in particular an electrically driven machine, via at least one switching device, having a control apparatus for evaluation of input signals and for production of a control signal, which is provided to the switching device, as a function of the evaluation, comprising a diagnosis parameter memory apparatus for storage of predeterminable switching process threshold values for the at least one switching device, and a diagnosis data analysis apparatus which is designed to compare the number of switching processes carried out by the switching device with the stored threshold values, and to initiate an action as a function of the comparison.

13. The control system as claimed in claim 12, wherein an action is the outputting of a warning message and/or switching to restricted operation of the load, and/or switching of the load to a safe state.

14. The control system as claimed in claim 12, wherein the diagnosis parameter memory device is designed to be failsafe and/or redundant.

15. The control system as claimed in claim 12, wherein the diagnosis parameter memory device is designed to be zero-voltage-proof.

16. The control system as claimed in claim 12, wherein the switching device has at least one switching element which is subject to wear and is designed to carry out a switching process by means of a control signal which is generated by the control system, in order to switch the electrical load, comprising an detection apparatus for detection of the number of switching processes carried out having a memory apparatus for permanent failsafe storage of the detected number.

* * * * *